United States Patent [19]

Momose

[11] Patent Number: 4,703,446
[45] Date of Patent: Oct. 27, 1987

[54] DATA PROCESSING UNIT DIAGNOSIS CONTROL APPARATUS

[75] Inventor: Yuya Momose, Tokyo, Japan

[73] Assignee: NEC Corporation, Tokyo, Japan

[21] Appl. No.: 750,075

[22] Filed: Jun. 28, 1985

[30] Foreign Application Priority Data

Jul. 3, 1984 [JP] Japan .............................. 59-137699
Aug. 10, 1984 [JP] Japan .............................. 59-168641

[51] Int. Cl.⁴ ..................... G06F 9/06; G06F 11/30; G06F 15/16
[52] U.S. Cl. ................................ 364/580; 364/900; 371/16; 371/20
[58] Field of Search ............... 364/550, 551, 580, 200, 364/900; 371/16, 18, 20

[56] References Cited

U.S. PATENT DOCUMENTS

| | | | |
|---|---|---|---|
| 4,308,615 | 12/1981 | Koezel et al. | 371/20 |
| 4,315,311 | 2/1982 | Causse et al. | 364/200 |
| 4,392,208 | 7/1983 | Burrows et al. | 364/900 |
| 4,606,024 | 8/1986 | Glass et al. | 371/16 |

FOREIGN PATENT DOCUMENTS

| | | | |
|---|---|---|---|
| 0082361 | 6/1980 | Japan | 371/16 |
| 0109942 | 6/1983 | Japan | 371/16 |
| 7810389 | 4/1980 | Netherlands | 371/16 |
| 2071886A | 3/1981 | United Kingdom | 371/16 |

Primary Examiner—Felix D. Gruber
Attorney, Agent, or Firm—Schwartz, Jeffery, Schwaab, Mack, Blumenthal & Evans

[57] ABSTRACT

A data processing unit diagnosis control apparatus comprises a microprocessor, a memory device, a data transfer circuit and a diagnostic processor. The diagnostic processor performs a diagnostic program of a data processing apparatus to be diagnosed. The diagnosis program is supplied from the memory device via the data transfer circuit under control of the microprocessor which issues an appropriate instruction to the data transfer circuit. The microprocessor is subsequently able to operate on other programs while the diagnostic processor executes the diagnostic program.

11 Claims, 5 Drawing Figures

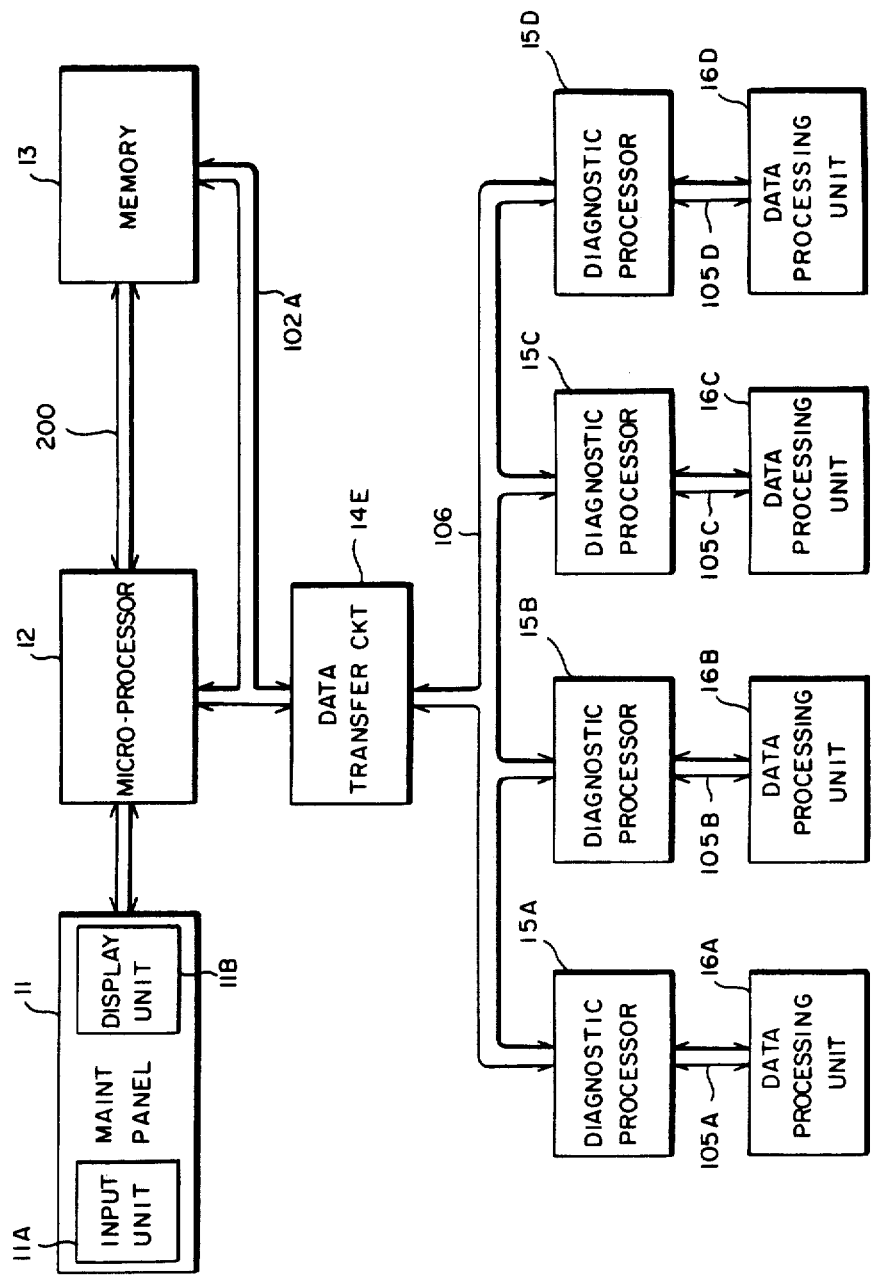

DATA PROCESSING UNIT DIAGNOSIS CONTROL APPARATUS

BACKGROUND OF THE INVENTION

This invention relates to a data processing unit diagnosis control apparatus, and more particularly a diagnosis control apparatus utilizing a microprocessor for loosely controlling a diagnosis.

There are data processing apparatus which require initial setting when they are started. For example, in a microprogram control type data processing apparatus with control memory constituted by a volatile random access memory (RAM), at the time of starting the apparatus, it is necessary to load in the control memory a microprogram stored in a nonvolatile information preserving means such as a ROM or a floppy disk. Among flip-flop circuits which hold information, there are some flip-flop circuits which are required to be set with predetermined values at the time of starting the apparatus depending upon the construction thereof. Such operation is termed an initial setting operation.

During the operation of the data processing apparatus, for the convenience of operation, there may be displayed the internal conditions of the apparatus, for example the state of a clock pulse, presence or absence of a malfunction, the state of loading and the contents of specific flip-flop circuits and registers. Such an operation is called a state display operation.

When the data processing apparatus becomes faulty, according to an instruction of the operator and a preprogrammed procedure, various operations are performed such as applying the clock pulse, reading out data stored in registers and memory devices, and reading out of data from a tracer contained in the apparatus. Such an operation is called diagnostic maintenance operation.

The initial setting operation, the state display operation and the diagnostic maintenance operation are generally termed a diagnosis control operation. In the prior art a portion or all of the diagnosis control operation has been exerted according to a preprogrammed procedure by using a processor contained in the data processing apparatus which is the object of the diagnosis control.

For example, U.S. Pat. No. 4,308,615 entitled "Microprocessor Based Maintenance System" discloses an example of the diagnostic maintenance system in which setting and display operations closely relating to the logical state of the data processing apparatus to be diagnosed are executed by the microprocessor instead of an operator according to a procedure based on the object of the diagnosis. The microprocessor is connected with the data processing apparatus to be diagnosed through an interface exclusively provided for the data processing apparatus, and directly controls the functional parts for diagnostic maintenance which are closely relating to the logical state of the data processing apparatus, by means of an I/O operation of the microprocessor.

With this system, however, since the apparatus to be diagnosed and the processor for controlling the diagnosis are closely related in terms of hardware, i.e., various registers, there is a defect that the load of the processor is large because the processor must handle a number of input/output operations of the various registers. Especially when the processor is used for controlling an interface between the operator and the apparaus, which is an object other than the control of the apparatus to be diagnosed, a response characteristic of the system is degraded due to the large load of the processor, or the construction of the program becomes complicated if the high response characteristic is to be maintained.

SUMMARY OF THE INVENTION

It is therefore an object of this invention to provide a novel diagnosis control apparatus capable of decreasing the load of a microprocessor that controls the diagnosis and capable of efficiently processing data without complicating the hardware and program.

In accordance with this invention there is provided diagnosis control apparatus comprising a microcomputer, a memory means, a data transfer circuit and diagnostic processor.

The microcomputer controls the processing of service request, data transfer, execution of a program and a diagnostic maintenance operation.

The memory means stores the program and the data and is accessible by the microcomputer.

The data transfer circuit reads out the program and data stored in the memory means and supplies them to the diagnostic processor in accordance with an instruction from the microprocessor, and the data transfer circuit also receives data from the diagnostic processor and transfers the same to the memory means in accordance with the instruction from the microprocessor.

The diagnostic processor performs the diagnosis of the data processing apparaus to be diagnosed and informs the status of the diagnosis to the microprocessor according to the program and data sent from the data transfer circuit.

BRIEF DESCRIPTION OF THE DRAWINGS

In the accompanying drawings:

FIG. 5 is a block diagram of yet another embodiment of the invention.

DETAILED DESCRIPTION OF THE PREFERRED EMBODIMENTS

Figure 1:
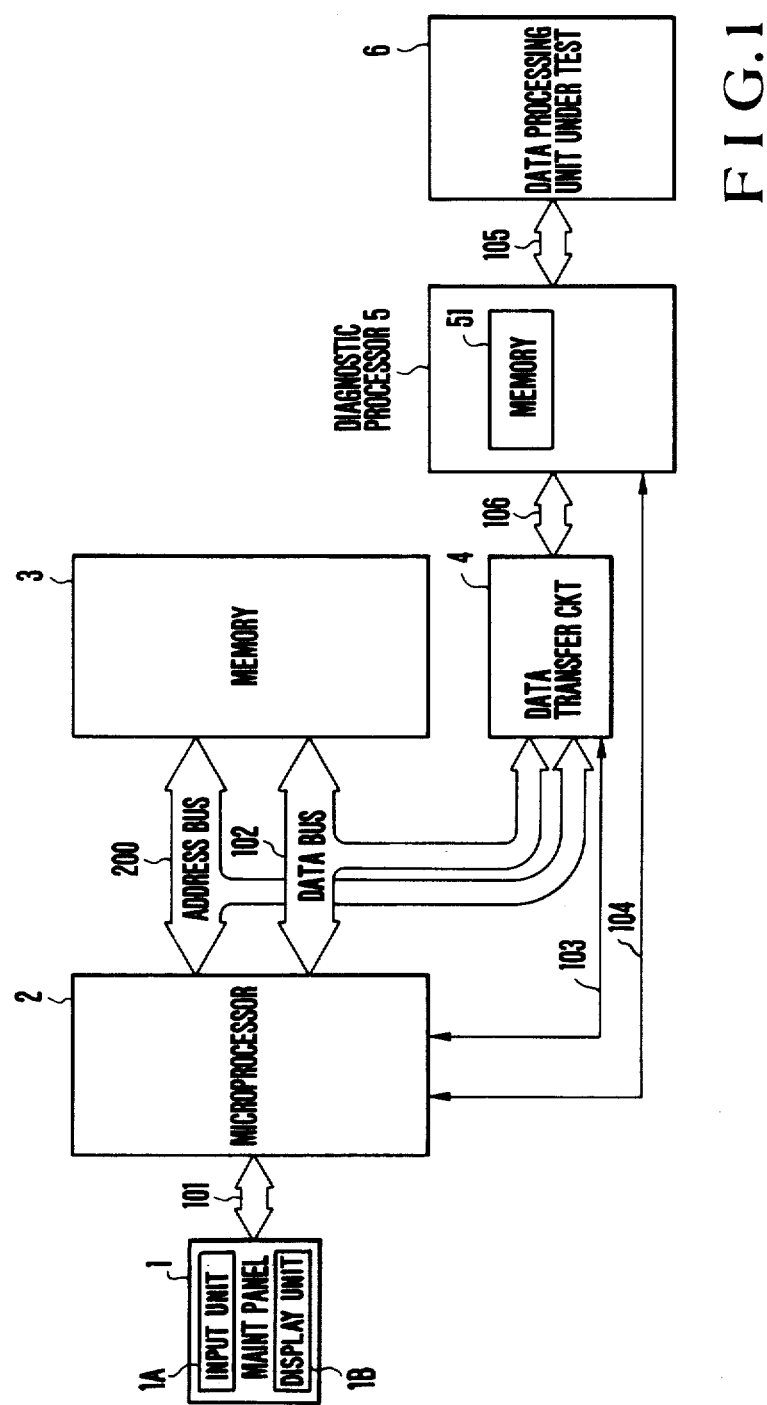
FIG. 1 is a block diagram showing one embodiment for the diagnosis control apparaus according to this invention.

The diagnosis control apparatus shown in FIG. 1 comprises a maintenance panel 1 provided with an input unit 1A, such as a keyboard, with which an operator inputs a service request, and a display unit 1B displaying the results of diagnosis, and a microprocessor 2 connected to the maintenance panel 1 through a signal line 101.

As the microprocessor 2 is used, for example, a microcomputer $\mu$ COM-82 manufactured by the assignee. This microcomputer is a general purpose microcomputer including an 8 bit parallel processing central processing unit (CPU) and is connected to memory means 3 through a 16 bit address bus 200 and an 8 bit data bus 102.

There is provided a bidirectional data transfer circuit 4 with one end connected to the data bus 102 and address bus 200, and the other end connected to a diagnostic processor 5 through a bus 106. The data transfer circuit 4 is also connected to a control terminal of the microprocessor 2 through a control line 103. The number 6 designates a data processing unit to be diagnosed which is connected to the diagnostic processor 5 through a bus 105. The diagnostic processor 5 is connected to the microprocessor 2 via a control line 104. The diagnostic processor 5 contains a memory 51.

Figure 2:
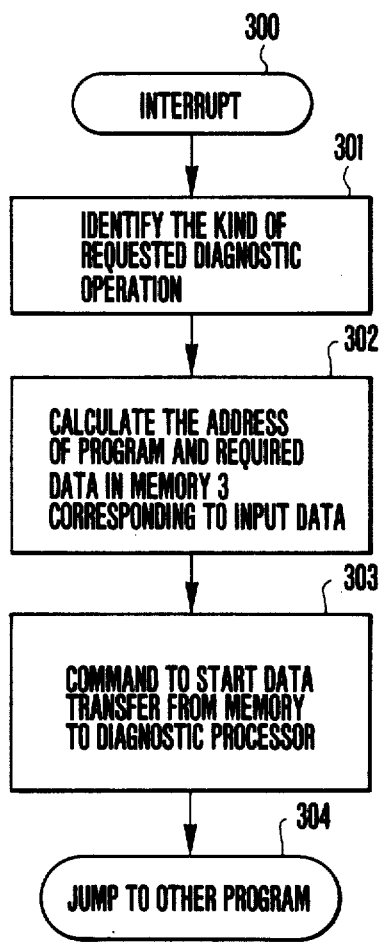
FIGS. 2 and 3 are flow charts showing the operation of a microcomputer.
Figure 3:
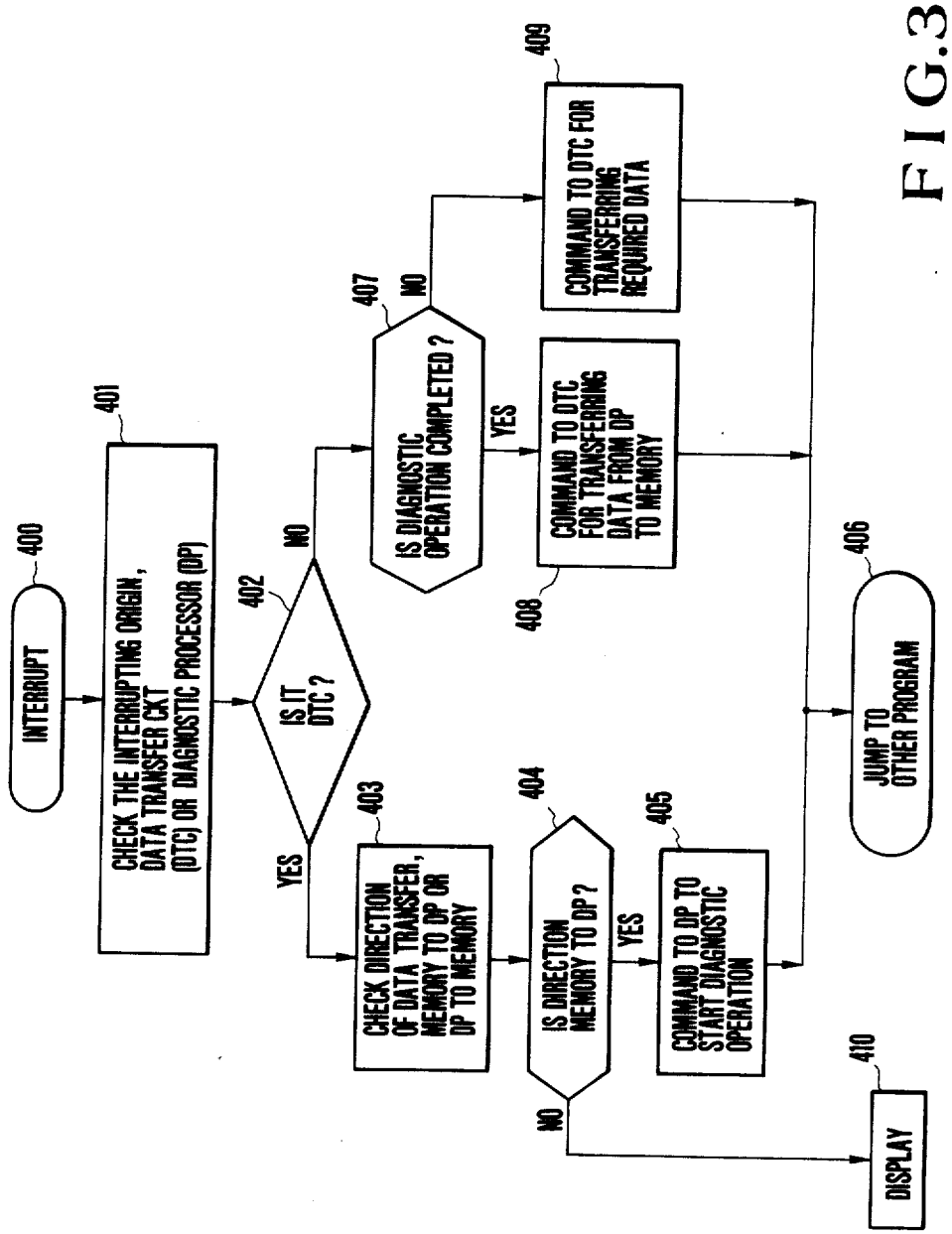

The operation of controlling the diagnosis of the data processing unit 6 by the diagnosis control apparatus shown in FIG. 1 is as follows. An example of the control operation of the microprocessor 2 is shown by the flow charts of FIGS. 2 and 3.

At first, when a diagnostic maintenance operation is executed, the command information of the operator is transmitted to the microprocessor 2 over signal line 101 from the maintenance panel 1. The microprocessor 2 receives the command information by means of an interruption or poling technique, then enters step 300 shown in FIG. 2. Then at step 301, the designation of the desired type of operation is identified by analyzing the data sent over the signal line 101. After that, at step 302, the microprocessor 2 calculates the address of memory 3 in which is stored the program and data necessary for diagnostic processor 5 to execute the diagnostic operation. At the same time, the microprocessor 2 reads the input data which the operator has set in the input unit 1A of the maintenance panel 1 for writing the input data in a predetermined address of the memory 3 over the data bus 102.

After the above preparatory operations, at step 303, the microprocessor 2 sends to the data transfer circuit 4 over control line 103 the address of memory 3 in which the program and the input data are stored and data length to instruct a start of the data transfer. Thereafter, at step 304, a jump is made to process another program. At this time, the microprocessor 2 is released from the control of diagnostic maintenance operation so that it can process the other service request, if necessary.

In response to the data transfer start instruction from the microprocessor 2, the data transfer circuit 4 reads out the program and data from the memory 3 through the data bus 102 instead of through microprocessor 2 to transfer the data of a previously designated length to the memory 51 in the diagnostic processor 5 via the data bus 106. Upon completion of transfer, the data transfer circuit 4 interrupts the microprocessor 2 over control line 103 for reporting the completion of transfer, at step 400 shown in FIG. 3. At step 401, the microprocessor 2 checks the origin of the interruption. In this case, the origin of the interruption is data transfer circuit 4, and the sequence is advanced to step 403 from step 402. At step 403, a check is made whether the data transfer which has caused the interruption is made from the memory 3 to diagnostic processor 5 or vice versa. In this case, as the direction of transfer is from memory 3 to data diagnostic processor 5, the result of the check in step 404 is YES, and the sequence is advanced from step 404 to step 405 at which an instruction for initiating execution of the program stored in the memory device 51 is sent to the diagnostic processor 5 via control line 104. Then at step 406, the sequence is jumped to another program. At this time, the microprocessor 2 is again released from the diagnostic maintenance operation. The diagnostic processor 5 executes the diagnostic maintenance operation of the data processing unit 6 in accordance with the data and program stored in the memory 51 contained therein. The instructions to the data processing unit 6 are sent over signal line 105. When it is necessary to access data in the data processing unit 6, the diagnostic processor 5 accesses the data according to a program and stores the read out data in its memory 51.

The diagnostic processor 5 interrupts the microprocessor 2 when the execution of the program is completed or the execution of the program is not completed but other additional data are required.

When the execution of the program stored in the memory 51 is completed, the diagnostic processor 5 sends an interruption signal to the microprocessor 2 through control line 104 for informing the completion of execution of the diagnostic program. At step 400 shown in FIG. 3, the microprocessor 2 starts again the control of the diagnostic maintenance operation and the sequence is advanced from step 402 to 407. At step 407 microprocessor 2 checks whether the reason of the interruption from the diagnostic processor 5 is the completion of the execution of program or a request of additional data. If the diagnostic operation is not completed, at step 409 microprocessor 2 sends to the data transfer circuit 4 a command for transferring the required data to diagnostic processor 5. If the diagnostic operation is completed, microprocessor 2 goes to step 408. At the step 408 microprocessor sends to the data transfer circuit 4 a command for reading data stored in the memory device 51 as well as the internal state of diagnostic processor 5, and for transferring the read out data to memory 3, and then program control is jumped to step 406 to process another program. The transfer of the data to the memory 3 is performed in the following manner. More particularly, when the microprocessor 2 sends the memory address and the data length to the data transfer circuit 4 for starting the data transfer, the data is directly transferred to the memory device 3 from the diagnostic processor 5 via data transfer circuit 4 without being controlled by the microprocessor 2. Therefore, in an interval before completion of the transfer, the microprocessor 2 is released from the diagnostic maintenance operation where it can execute the processing of other service request.

Upon completion of the transfer of the diagnostic data at step 408, the data transfer circuit 4 again sends an interruption signal at step 400. At this time, the microprocessor 2 advances the sequence to step 410 through steps 401, 402, 403, and 404, and if desired, reads out the sampled data saved into the memory 3 via data bus 102 for sending the read out data to the maintenance panel 1 via signal line 101 for displaying or printing the data. After that, the microprocessor 2 enters a service request waiting state. Thereafter, if necessary, the microprocessor 2 can transfer a program or data or both for starting the diagnostic processor 5 any desired number of times.

The above description concerns the diagnostic maintenance operation. The state display operation is as follows. When data variation, etc. are transmitted to microprocessor 2 via control line 104, the microporcessor 2 causes the data transfer circuit 4 to transfer a program and data necessary for the state display from memory 3 to the diagnostic processor 5. The diagnostic processor 5 executes a state display program and after the completion of execution of the program informs the microprocessor 2 of its completion. Microprocessor 2 directs data transfer circuit 4 to transfer to the memory 3 data representing the state of the data processing unit 6. The microprocessor 2 causes the maintenance panel 1 to display this data.

In a case of initial setting operations, the microprocessor 2 causes the data transfer circuit 4 to transfer the program and data necessary for the initial setting from memory 3 to the diagnostic processor 5, whereby the diagnostic processor 5 performs the initial setting based on this data.

As above described, after issuing a bidirectional transfer initiation between the memory 3 and the diagnostic processor 5 in accordance with a designation from the maintenance panel 1 or a predetermined procedure, the microprocessor 5 is released from the diagnosis control operation until receiving an interruption signal from the data transfer circuit 4 or the diagnostic processor 5, so that it is free to execute other processings. As a consequence the load of the microprocessor 2 is decreased and the efficiency and versatility of the data processing can be improved.

Identification of the requested diagnosis control operation is made by the microprocessor 2, so that any hardware or program is not necessary for the diagnostic processor 5 for effecting identification and branching, thereby simplifying the construction of hardware and software. Also the memory device 51 contained in the diagnostic processor 5 can be used by clearing its content each time a program is executed and data are transferred so that so long as it can store a program and data necessary for each diagnosis control operation, its capacity may be small.

Figure 4:
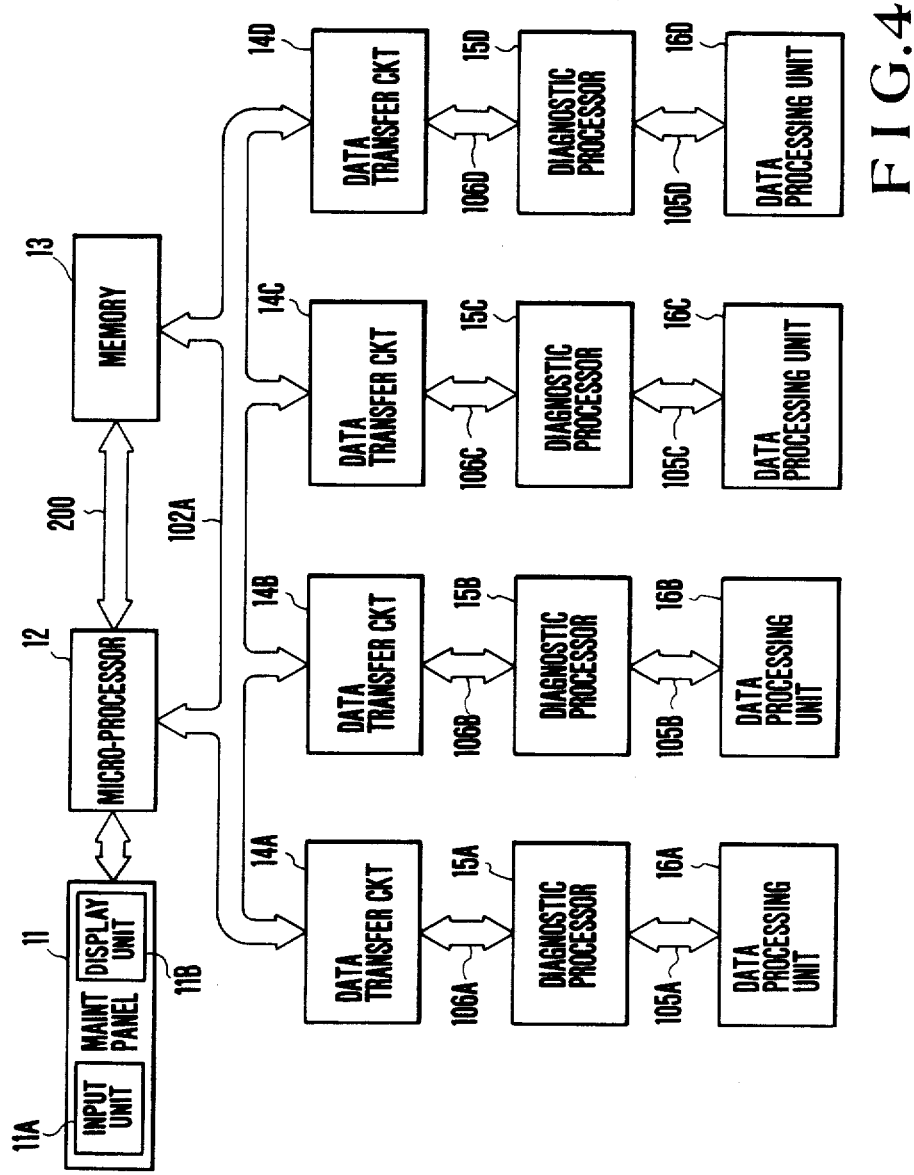
FIG. 4 is a block diagram showing another embodiment of this invention.

FIG. 4 shows a modified embodiment of this invention in which the invention is applied to the diagnosis control of a plurality of (in this case 4) data processing units.

The data processing units 16A–16D may be the same or different or a combination of different ones. The number of the data processing units is not restricted to four.

Respective data processing units 16A–16D are diagnosed by diagnostic processors 15A–15D respectively connected by buses 105A–105D. Each diagnostic processor 15A–15D contains a memory device not shown. The diagnostic processors 15A–15D are connected to a common bus 102A through bidirectional data transfer circuits 14A–14D respectively. Further respective diagnostic processor 15A–15D are operated by a common synchronizing signal.

The bus 102A includes four diagnostic processor selection signal lines respectively corresponding to four diagnostic processors 15A–15D, control lines and data lines.

The microprocessor 12 can select diagnostic processor 15A–15D through a diagnostic processor selection signal line of the bus 102A in accordance with an input signal from the keyboard of the maintenance panel 11 or with a predetermined procedure. Thus, only the selection signal line of the bus 102A corresponding to the selected diagnostic processor is brought to a logic "1" state while other selection signal lines are brought to a "0" state.

Where the diagnosis control operations of the diagnostic processors 15A–15D are different, the microprocessor 12 brings a selection signal line of the bus 102A corresponding to a diagnostic processor, for example 15A, to be selected to a "1" state whereby the data transfer circuit 14A establishes a signal path between bus 102A and 106A, but signal paths for other diagnostic processor 14B–14D are not established. Thereafter, in the same manner as has been described in connection with FIG. 1, the data processing unit 16A of the diagnostic processor 15A is diagnosed. Controls for other diagnostic processors 15B–15D are effected by bringing a corresponding selection signal line of the bus 102A to a logic "1" state in the same manner as the processor 15A.

Where the diagnostic processors 15A–15D are operated differently, the selection signal lines of the bus 102A are sequentially brought to a logic "1" state such that the program and necessary data are transferred from memory 13 in the order of data transfer circuits 14A, 14B, 14C and 14D, for example, whereby the diagnostic processors 15A–15D sequentially receive necessary programs and data from the memory 13 for executing the programs.

Completion of the execution of the programs are indicated to microprocessor 12 by supplying interruption signals to the microprocessor 12 from respective diagnostic processors 15A–15D.

Where it is desired to cause the diagnostic processors 15A–15D to execute the same program at the same time, the microprocessor 12 sets a "1" to all selection signal lines of the bus 102A so as to simultaneously transfer the program and data to respective diagnostic processors 15A–15B from the memory 13 via data transfer circuits 14A–14D. The diagnostic processors 15A–15D simultaneously execute diagnostic maintenance operations in accordance with a common synchronizing signal.

When the diagnostic processors 15A–15D are divided into groups of any number for assigning different programs to different groups, the programs and data are sequentially transferred to respective groups.

As described above, after decoding the instruction from the maintenance panel 11 and transferring of the program and data, the microprocessor 12 is released from the diagnosis control so that it can execute other processings.

When an interruption is made in response to termination of the execution of the programs of respective diagnostic processors, the microprocessor 12 returns to the diagnosis control operation for merely instructing the display and the desired operations.

As each data processing unit is diagnosed by a corresponding diagnostic processor, respectively, overall diagnostic operations of data processing units 16A–16D are conducted in parallel, resulting in enhancement of the system efficiency and versatility.

Although in the foregoing example, the diagnostic processor selection signal lines of the bus 102A were provided one for each diagnostic processor, less lines, for example two lines, may be provided by using coded signals.

In FIG. 4, each diagnostic processor 15A–15D is connected to respective data transfer circuit 14A–14D. However, as shown in FIG. 5, the data transfer circuits 14A–14D may be replaced by one data transfer circuit, hereinafter referred to 14E, one terminal thereof being connected to data bus 102A and another terminal thereof commonly connected to diagnostic processors 15A–15D through a bus 106. Such a data transfer circuit 14E includes a means for selecting or switching the bidirectional paths between the data bus 102A and the diagnostic processors 15A–15D according to the instruction from the microprocessor 12.

The detailed description of the operation of the data transfer circuit 14E is omitted as it is easily analogized using the description pertaining to the block diagram in FIG. 4.

According to the embodiment described above, there is provided a diagnosis control system of a plurality of data processing units which has a high processing capability as well as excellent versatility. In the same manner, as the first embodiments, since the diagnostic processor requires a memory device of a small capacity, the hardware and programs can be simplified.

What is claimed is:

1. A data processing unit diagnosis control apparatus comprising:
    a microprocessor for controlling processing of a service request, a transfer of data to and from a data processing apparatus to be diagnosed, and selection of a diagnostic program for a diagnostic maintenance operation;
    memory means for storing said diagnostic program and said data, said memory means accessible by said microprocessor;
    data transfer means for reading out said diagnostic program selected by said microprocessor and said data stored in said memory means and sending out the same in accordance with an instruction from said microprocessor, and for receiving the data from said data processing apparatus to be diagnosed and transferring the same to said memory means in accordance with said instruction from said microprocessor; and
    diagnostic processor means for performing diagnosis of said data processing apparatus to be diagnosed according to said selected diagnostic program and data sent from said data transfer means and communicating a status of the diagnosis to said microprocessor through said data transfer means, thereby performing said diagnostic maintenance operation.

2. The apparatus according to claim 1 wherein said diagnostic processor means contains therein a memory device.

3. The apparatus according to claim 1 which further comprises a maintenance panel including display means for displaying a state of said data processing apparatus to be diagnosed sent from said diagnostic processor means, and an input unit for requesting a service.

4. The apparatus according to claim 1 wherein transfer of said program and said data between said memory means and said diagnostic processor means are effected directly without intervention of said microprocessor.

5. The apparatus according to claim 1 wherein said diagnostic processor means includes a plurality of diagnostic processors, each of which is connected to a respective data processing apparatus to be diagnosed.

6. The apparatus according to claim 5 wherein said data transfer means comprises a plurality of data transfer circuits, each of which is connected to said each diagnostic processor in a one to one correspondence.

7. The apparatus according to claim 5 wherein said data transfer means comprises one data transfer circuit, to which said plurality of diagnostic processors are commonly connected by a bus.

8. The apparatus according to claim 5 wherein said plurality of diagnostic processors are independently controlled by said microprocessor.

9. The apparatus according to claim 5 wherein separate groups of said plurality of diagnostic processors are independently controlled by said microprocessor.

10. The apparatus according to claim 8 wherein said microprocessor generates a select signal for each of said diagnostic processors, and each of said plurality of diagnostic processors is responsive to a particular select signal for operation thereof.

11. The apparatus according to claim 9, wherein said microprocessor generates a different select signal for each group and wherein each diagnostic processor of each group is responsive to said select signal for operation thereof.

* * * * *